United States Patent Office 3,327,024
Patented June 20, 1967

3,327,024
CATECHOL-PHOSPHORUS SULFIDE REACTION
PRODUCT AND AMINE SALTS THEREOF
Edwin L. De Young and Edwin J. Latos, Chicago, Ill., assignors to Universal Oil Products Company, Des Plaines, Ill., a corporation of Delaware
No Drawing. Filed Aug. 2, 1963, Ser. No. 299,462
10 Claims. (Cl. 260—925)

This application relates to a novel composition of matter comprising the reaction product of a catechol with phosphorus pentasulfide and to the use of the resultant reaction product.

The novel reaction product is particularly useful as an additive to organic substances. This reaction product imparts high thermal stability to the organic substrate which is of extreme importance when the substrate ecounters high temperatures during service. The reaction product itself is of high thermal stability and accordingly retains its high activity during such high temperature service.

Another important property of the reaction product of the present invention is in retarding photolytic reactions in the organic substrate. Still another important property of the reaction product is in retarding oxidation. While it is believed that photolysis occurs in the absence of oxygen, in most cases the substrate either contains entrained oxygen or is exposed to an oxygen atmosphere and the decomposition encountered by the organic substrate includes both photolysis and oxidation. As another important advantage to the present invention, the reaction product serves to inhibit such photooxidation.

The novel reaction product is prepared by the reaction of a catechol with phosphorus pentasulfide ($P_2S_5$), using two mole proportions of the catechol with one mole proportion of $P_2S_5$. While applicants do not intend to be limited to the following explanation, it is believed that the reaction proceeds somewhat in the following manner:

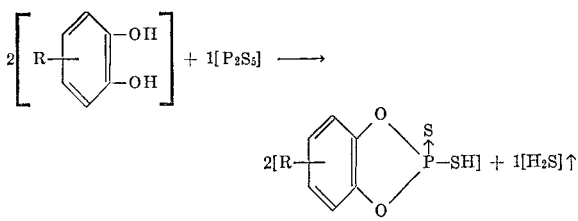

where R is hydrogen, a hydrocarbon radical or a substituted hydrocarbon radical as will be discussed more fully hereinafter.

While it is believed that the reaction proceeds in the manner illustrated by the above equation, applicants are not certain that the final product is of the structure illustrated in the above equation. Accordingly, applicants do not wish to be limited to this particular structure, but will define the product by the method of manufacture.

As hereinbefore set forth, an important advantage of the novel reaction product of the present invention is its ability to impart high thermal stability to an organic substance and also the high thermal stability of the reaction product itself. This is believed to be due to the cage-like or cyclic configuration obtained by the heterocyclic ring containing the oxygen and phosphorus. This thermal stability can be compared, for example, with the reaction product of an aliphatic alcohol and $P_2S_5$, in which product decomposition occurs at elevated temperature to liberate olefinic fragments. The reaction product of the aliphatic alcohol and $P_2S_5$ does not contain the cage-like or cyclic configuration which is present in the reaction product of the present invention.

From the above discussion, it will be seen that an essential feature of the present invention is that catechol is employed as one of the reactants. It is essential that the hydroxyl groups are attached to adjacent carbon atoms in order to form the stable cage-like or cyclic configuration illustrated in the above equation which, as hereinbefore set forth, is believed to impart the high thermal stability to the reaction product.

While catechol may be employed as the reactant, it generally is preferred that a substituted catechol be utilized for this purpose. Depending upon the particular use of the reaction product, the substituent may comprise an alkyl radical ranging from methyl through eicosyl and, in some cases, the alkyl radical may contain up to forty or more carbon atoms. When used as an additive in lubricating oil, the alkyl radical preferably contains from about six to about twenty carbon atoms and, accordingly, the preferred catechol for use as a reactant will be selected from hexyl catechol, heptyl catechol, octyl catechol, nonyl catechol, decyl catechol, undecyl catechol, dodecyl catechol, tridecyl catechol, tetradeyl catechol, pentadecycl catechol, hexadecyl catechol, heptadecyl catechol, octadecyl catechol, nonadecyl catechol, eicosyl catechol, etc. In another embodiment the catechol may contain two or more alkyl substituents, each alkyl containing from one to twenty carbon atoms. While the alkyl catechols are generally preferred, it is understood that R in the above equation may comprise an alkenyl substituent, ranging from vinyl through eicosenyl or, in some cases, higher molecular weight alkenyl catechols containing up to about forty carbon atoms. In another embodiment R in the above equation may comprise an aromatic substituent including particularly phenyl, tolyl, ethylphenyl, xylyl, cumyl, etc., or a cycloparaffin radical including cyclopropyl, cyclobutyl, cyclopentyl, cyclohexyl, cycloheptyl, cyclooctyl, etc.

The substituted catechols may be obtained in any suitable manner. A convenient method of forming alkyl catechol is by the reaction of catechol with an olefin, alcohol, alkyl halide, or other suitable alkylating agent in the presence of an alkylation catalyst including, for example, sulfuric acid, hydrochloric acid, hydrofluoric acid, boron trifluoride, aluminum chloride, etc. The alkylation reaction is well known in the art and no novelty therefor is claimed herein. In general, the alkylation reaction is effected at a temperature of from about ambient to about 392° F. and preferably at a pressure sufficient to maintain substantially liquid phase, which pressure may range from 50 to 1000 pounds per square inch or more. In another method the alkylation catalyst is composited with a suitable carrier including clay, alumina, silica, etc., and the resultant catalyst composite disposed as a fixed bed in a reaction zone through which the reactants are passed in either upward or downward flow. Because catechol is a solid at ambient temperature, it generally is preferred to form a solution of the catechol in a suitable solvent for convenience in handling and reacting. Any suitable solvent may be employed. A particularly preferred solvent comprises a normal paraffin as, for example, pentane, hexane, heptane or mixtures thereof.

The reaction of the catechol with $P_2S_5$ is effected in any suitable manner and generally by intimately mixing the reactants and heating to a temperature of from about 212° to about 392° F. The reactants are used in a ratio of two mole proportions of reaction product per one mol proportion of $P_2S_5$, although an excess of one reactant may be employed when desired. The reaction occurs with the liberation of $H_2S$, alone or along with other volatile products. In one embodiment the reaction is effected by heating with intimate stirring in the absence of a solvent. Here again, the reaction conveniently is effected in the presence of a solvent for ease in handling and reaction. The temperature of reaction generally will depend upon the particular solvent employed. Any suitable solvent may be employed, a particularly preferred solvent comprising an aromatic hydrocarbon and more particularly xylene. Other solvents include benzene, toluene, ethylbenzene, cumene, etc., pentane, hexane, naphtha or a higher boiling hydrocarbon distillate of aromatic, paraffinic or cycloparaffinic characteristics. As hereinbefore set forth, the reaction temperature will depend upon the particular solvent used and may range from 167° to 437° F. and preferably from 257° to 347° F. When desired, the reaction is effected at superatmospheric pressure which may range from about 10 to 1000 pounds per square inch or more.

At the present time there are different schools of thought as to the structure of phosphorus pentasulfide. It is believed to be $P_2S_5$, but also has been expressed as $P_4S_{10}$. Various structures have been proposed including a polymeric cage-like configuration. Regardless of the exact structure of this compound, phosphorus pentasulfide is available commercially and is used for reaction with the catechol in the manner herein set forth. In the interest of simplicity, phosphorus pentasulfide is also referred to in the present specifications as $P_2S_5$, with the understanding that this is intended to cover the phosphorus pentasulfide available commercially or prepared in any suitable manner.

The reaction product is recovered as a viscous brown liquid dissolved in the xylene or other solvent and may be used as such. However, when desired, the solvent may be removed by vacuum distillation and the reaction product is recovered as a viscous dark brown liquid free of solvent.

As hereinbefore set forth, the reaction product imparts high temperature stability to an organic substrate and also serves to retard photolysis and oxidation. Accordingly, the reaction product is of especial utility in organic substrates which encounter high temperatures during use. An illustrative example of such an organic substance is lubricating oil, which may be of mineral origin or synthetically prepared. In such oils the reaction product acts to impart high temperature stability, to retard oxidation and to retard photolysis, thus serving as an E.P. additive to reduce wear, score, seizure, loss of lubricity, etc., and thereby to prolong the useful life of the lubricating oil. In another embodiment the reaction product is used as an additive in plastics, in which the reaction product serves as an antioxidant, UV light absorber, etc., to retard both oxidative and photolytic deterioration of the plastic. This is especially important in plastics which are installed or placed outdoors and exposed to the rays of the sun.

While the reaction product of the catechol and $P_2S_5$ may be used as such, in many cases it is desired to utilize an additive of neutral or basic properties. Accordingly, another embodiment of the present invention comprises an amine salt of the reaction product. Any suitable amine may be used in preparing the salt and may comprise a monoamine or polyamine. The amine must contain at least one primary or secondary amine; that is, it must have at least one active hydrogen attached to a nitrogen atom. In one embodiment the amine may be a low molecular weight amine including, for example, methyl amine, ethyl amine, propyl amine, pentyl amine, ethylene diamine, propylene diamine, butylene diamine, diethylene triamine, dipropylene triamine, triethylene tetraamine, etc. When the additive is used in certain organic substrates, improved solubility is obtained by employing higher molecular weight amines which may contain from six to forty or more carbon atoms. Illustrative amines include hexyl amine, heptyl amine, octyl amine, nonyl amine, decyl amine, undecyl amine, octyl amine, tridecyl amine, tetradecyl amine, pentadecyl amine, hexadecyl amine, heptadecyl amine, octadecyl amine, nonadecyl amine, eicosyl amine, etc., N-hexyl-ethylene diamine, N-heptyl-ethylene diamine, N-octyl-ethylene diamine, N-nonyl-ethylene diamine, N-decyl-ethylene diamine, N-undecyl-ethylene diamine, N-dodecyl-ethylene diamine, N-tridecyl-ethylene diamine, N-tetradecyl-ethylene diamine, N-pentadecyl-ethylene diamine, N-hexadecyl-ethylene diamine, N-heptadecyl-ethylene diamine, N-octadecyl-ethylene diamine, N-nonadecyl-ethylene diamine, N-eicosyl-ethylene diamine, etc., N-alkyl-diethylene triamines in which the alkyl contains from six to twenty carbon atoms, $N^1,N^3$-dialkyl-diethylene triamines in which the alkyl contains from six to twenty carbon atoms, $N^1,N^4$-dialkyl-triethylene tetraamines in which the alkyl contains from six to twenty carbon atoms, etc. Conveniently the amines are prepared from fatty acids and thus the amines include capryl amine, lauryl amine, palmityl amine, stearyl amine, etc., decylenyl amine, palmitoleyl amine, oleyl amine, linoleyl amine, gadoleyl amine, etc.

The amines hereinbefore set forth are aliphatic amines. It is understood that cyclic amines also may be used but not necessarily with equivalent results. For example, a cyclic amine is prepared by reacting diethylene triamine with carbon disulfide. Other aromatic amines include aniline, alkylated anilines, phenylene diamines, diaminodiphenylalkanes, and particularly those in which the alkane group comprises methane, ethane, propane and butane, diaminodiphenyl amines, diaminodiphenyl sulfides, diaminodiphenyl ethers and particularly those diaminodiphenyl compounds containing an alkyl substituent of from six to twenty carbon atoms attached to one or both of the nitrogen atoms.

The salt of the reaction product and amine is prepared in any suitable manner and generally is readily obtained by intimately mixing the reaction product and the amine at ambient temperature. In general, the reaction product and amine will be used in equal mole proportions, although an excess of the reaction product or of the amine may be employed when desired. Thus, the mole proportions of the reaction product and amine will be within the range of from 0.5:1 to 2:1.

As hereinbefore set forth, the reaction product of the present invention is particularly advantageous for use in lubricating oil. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other natural oils include those of animal, marine or vegetable origin.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from 3 to 12 carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from 3 to 12 carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

Because the reaction product of the present invention also retards photolytic decomposition, the reaction product also is particularly useful as an additive in plastics and resins. In one embodiment the plastic comprises an olefin polymer and especially a solid olefin polymer. This may comprise homopolymers or copolymers of olefinic hydrocarbons including particularly polyethylene, polypropylene and polybutylene, as well as copolymers of ethylene and propylene, ethylene and butylene and propylene and butylene. In addition, solid polymers prepared from one or more higher molecular weight olefins or mixtures may be stabilized in accordance with the present invention.

Deterioration of the solid olefin polymers when exposed to sunlight is characterized in its early stages by the breaking of the polymer chain and the formation of carbonyl groups. As oxidation continues, the polymer cracks and loses tensile strength to the point of mechanical failure. For example, electrical insulation prepared from solid olefin polymers will undergo embrittlement, increase of power factor and loss of electrical resistance when used in exposed locations. Other examples of the use of solid olefin polymers subject to outdoor exposure are in the preparation of sheets which are used in draping open areas in building construction in order to protect the construction from the effect of weather and in the manufacture of light weight outdoor furniture, cover for greenhouses, awnings, etc. It is readily apparent that the fabricated product must be protected against deterioration caused both by sunlight and air.

Another plastic available commercially on a large scale is polystyrene. Polymerization of styrene proceeds readily in an emulsion of 5% sodium oleate solution and results in high molecular weight polymers. In another method styrene is polymerized in the presence of aluminum trialkyls. In general, polystyrene is thermoplastic which, however, may be modified by effecting the polymerization in the presence of a small amount of divinylbenzene. The polystyrene-type resins are particularly useful in the manufacture of molded or machine articles which find application in such goods as windows, optical goods, automobile panels, molded household articles, etc. One disadvantage of polystyrene is its tendency to deteriorate when exposed to direct sunlight and air for extended periods of time and this disadvantage is minimized by the use of the reaction product of the present invention.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidene chloride, alkyl acrylates, alkyl methacrylates, alkyl maleates, alkyl fumarates, etc.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), etc. Here again, deterioration of the solid polymer occurs due to ultraviolet light and oxidation.

Still other plastics are prepared from other monomers and are available commercially. Illustrative examples of such other solid polymers include phenolformaldehyde resins, urea-formaldehyde resins, melamineformaldehyde resins, acryloid plastics which are derived from methyl, ethyl and higher alkyl acrylates and methacrylates as monomers used in the polymerization. Also included in the solid polymers are the polyurethane foams which are becoming increasingly available on a large scale, and polyacetals, especially polyformaldehydes, such as Delrin and Celcon.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

While the reaction product of the present invention is particularly advantageous in substrates subjected to high temperatures, it is understood that the reaction product also may be used in other substrates subject to decomposition due to photolysis and/or oxidation. Such other organic substrates which deteriorate in storage, during treatment and/or in use include hydrocarbons and particularly motor fuels such as unsaturated gasoline, blends of unsaturated and saturated gasolines, etc., as well as jet fuel, diesel fuel, fuel oil, residual oil, drying oil, waxes, etc.

The concentration of reaction product to be employed as an additive will depend upon the particular substrate in which it is to be used. In general, the reaction product is used in a concentration of from about 0.001% to about 25% by weight of the organic substrate, and preferably is within the range of from about 0.01% to about 5% by weight of the substrate.

It is understood that the reaction product of the present invention may be used along with other additives incorporated in the organic substrate. The other additives will depend upon the particular organic substrate. For example, in lubricating oil the additional additives may comprise one or more of viscosity index improver, pour point depressant, anti-foam additive, detergent, corrosion inhibitor, additional antioxidant, etc. In plastics, the other additive may comprise one or more of additional antioxidant, additional ultra violet light absorber, dye, etc. In other substrates the other additives may comprise, in addition to one or more of the additives recited above, metal deactivator, dye, corrosion inhibitor, antiozonant, etc.

When used in plastic, the other additives generally are of the phenolic or amine type and may comprise phenyl-alpha-napthylamine, phenyl - beta - napthylamine, phenothiazine, Nonox WSP, Nonsox Cl, dialkylated phenols, trialkylated phenols including 2,6 - di - tertiarybutyl - 4 - methylphenol, 2,4 - dimethyl-6 - tertiarybutylphenol, etc., Santonox R, Santowhite, alkyl-alkoxyphenols, 2246 and 425 (American Cyanamid), diphenyl-p-phenylenediamine, 1,1,3-tris-(2-methyl-4-hydroxy-5-t - butylphenyl) - butane, 703 (Ethyl Corporation). Salol (salicylic acid esters), p-octyl-phenylsalicylate, various phosgene alkylated phenol reaction products, various alkoxyalkyldihydroxybenzophenones, polyalkyldihydroxybenzophenones, tetrahydroxybenzophenones, 2,4,5 - trihydroxybutyrophenone, etc. Other ultraviolet light stabilizers include nickel-bis-dithiocarbamates, nickel-bis-dihydroxypolyalkylphenol sulfides, dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc.

The reaction product of the present invention is incorporated in the organic substrate in any suitable manner and at any suitable stage of preparation. When incorporated in a liquid substrate, the reaction product is added thereto and intimately mixed by conventional means. When added to a solid or semi-solid substrate, the reaction product of the present invention preferably is added during the manufacture thereof in order to obtain intimate mixing. For example, in the manufacture of grease, the reaction product preferably is added during the manufacture as, for example, by being commingled with one or more of the components of the grease prior to compositing or processing thereof, or may be added directly to the mix at any time, preferably before final processing. In the case of a solid substrate, the additive is incorporated during the manufacturing or the solid substrate, once prepared, may be dipped, soaked or immersed in the additive, or the latter may be sprayed, brushed or otherwise applied to the solid substrate.

The following examples are introduced to illustrate further the novelty and utility of the present invention but not with the intention of unduly limiting the same.

*Example I*

The reaction of this example was prepared by reacting dodecyl catechol with $P_2S_5$.

The dodecyl catechol was prepared by suspending 220 g. (2 mole) of catechol in one liter of a hexane fraction. This suspension and 354 g. (2 mole) of propylene tetramer were passed into a two liter flask equipped with a stirrer and reflux condenser. Boron trifluoride then was passed into the flask until all of the catechol was in solution. The mixture then was stirred for one-half hour at room temperature to effect the alkylation. In order to insure complete reaction, the mixture was further stirred for one hour on a steam bath. The reaction mixture then was dissolved in additional hexane fraction, washed with sodium carbonate and then with water, followed by drying over anhydrous sodium sulfate, filtering and distilling on a steam bath. The solvent was removed by distilling under vacuum, after which the product was further distilled to separate dodecyl catechol which was recovered as a pale yellow syrup having a boiling point of 330° F. at 0.1 mm. Hg.

The dodecyl catechol, prepared in the above manner, was reacted with $P_2S_5$ as follows: 55.6 g. (0.2 mole) of the dodecyl catechol were dissolved in 200 ml. of xylene and 24.4 g. (0.11 mole) of $P_2S_5$ were added thereto. The mixture was heated to reflux temperature, and the reaction occurred with the liberation of hydrogen sulfide. Following completion of the reaction, the reaction mixture was cooled, filtered and stripped with nitrogen to remove entrained hydrogen sulfide. The product then was distilled under vacuum to remove the xylene solvent. The product was analyzed and found to have a molecular weight of 348 which corresponds to the theoretical molecular weight for dodecyl catechol dithiophosphate of 372. The reaction product is a dark brown viscous liquid having an index of refraction $n_D^{20}$ of 1.53355, a density $d_4^{20}$ of 1.0435 and a viscosity of 42.51 cs., 198 SUS at 100° F.

*Example II*

The reaction product of this example is prepared by reacting two moles of hexyl catechol with one mole of $P_2S_5$. The hexyl catechol is dissolved in toluene and then is commingled with the $P_2S_5$ in a reaction zone equipped with an internal mixer and a reflux condenser. The mixture is heated and maintained at reflux temperature until the reaction is completed. Hydrogen sulfide is liberated and removed during the reaction. The reaction mixture is allowed to cool and then is stripped to remove entrained hydrogen sulfide and is recovered in admixture with the solvent as a viscous liquid.

*Example III*

The reaction product of this example is prepared by reacting one mole proportion of 4,5-dimethyl catechol with 0.5 mole proportion of $P_2S_5$. The reactants and xylene solvents are disposed in a reaction zone equipped with an internal stirrer and a refluxing condenser. The reaction mixture is heated and maintained at reflux temperature until the reaction is completed. Hydrogen sulfide is liberated and removed during the reaction. Following completion of the reaction, the reaction mixture is cooled, vacuum distilled to remove solvent and the reaction product is recovered as a viscous dark liquid.

*Eaxmple IV*

As hereinbefore set forth, amine salts of the reaction product are prepared in accordance with the present invention. In the preparation of this example 13 g. (0.035 mole) of the reaction product of dodecyl catechol and $P_2S_5$, prepared in the manner described in Example I, were commingled with 9.5 g. (0.035 mole) of oleyl amine. The reactants were mixed at room temperature. The reaction is exothermic. The salt was recovered as a viscous dark brown liquid.

Example V

This example describes the preparation of the N-tallow-1,3-diaminopropane salt of the reaction product of dodecyl catechol and $P_2S_5$. The salt was prepared by mixing, at room temperature, 11 g. (0.0295 mole) of the reaction product of dodecyl catechol and $P_2S_5$, prepared in the manner described in Example I, with 5.3 g. (0.0295 mole) of N-tallow-1,3-diaminopropane. Here again, the reaction was exothermic. The N-tallow-1,3-diaminopropane used in this example is available commercially under the trade name of "Duomeen T." The salt was recovered as a dark brown liquid.

Example VI

This example illustrates the preparation of a cyclic amine salt of the reaction product of dodecyl catechol with $P_2S_5$. The cyclic amine was prepared by reacting equal mole proportions of $N^1,N^3$-disec-octyl-diethylenetriamine and $CS_2$. The amine was dissolved in a hexane fraction and cooled to 60–68° F. Carbon disulfide similarly was dissolved in a separate portion of the hexane fraction and then was added dropwise to the solution of the amine in the hexane fraction. Because the reaction is highly exothermic, the reaction mass was cooled to maintain the temperature below room temperature. A light yellow precipitate was recovered and was vacuum distilled to remove the solvent, following which the precipitate was heated to about 355° F. for about one hour to liberate hydrogen sulfide and to recover the cyclic amine as a fluid straw colored liquid. It is believed that the resultant product is 1-sec-octyl-aminoethyl-2-thio-3-sec-octyl imidazoline. The salt was prepared by stirring at room temperature 36 g. (0.097 mole) of the reaction product of dodecyl catechol and $P_2S_5$, prepared as described in Example I, with 35 g. (0.097 mole) of the amine formed by reacting $N^1,N^3$-disec-octyl-diethylenetriamine with carbon disulfide. Heat was evolved during the formation of the salt and the salt was recovered as a red-orange viscous liquid.

Example VII

As hereinbefore set forth, the reaction product of the present invention is of especial utility in substrates encountering high temperatures during use. An example of such a substrate is lubricating oil and especially such oils used in the lubrication of hypoid gears which must meet severe requirements of high torque-low speed, low torque-high speed and high torque-high speed conditions. The requirements are even more severe because such oils must retain their lubricity properties for long periods of time as exemplified, for example, by the recommendations of not changing oil for one year or more or 20,000 miles or more of operation and even up to 100,000 miles for the life of the vehicle.

One method of evaluating E.P. (extreme pressure) lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. In one series of tests the machine was operated (1) for 5 minutes at 250 pound load and then for 45 minutes at 500 pound load and (2) 5 minutes each at 250 and 500 pound loads and then 45 minutes at 750 pound load. The data collected includes the temperature of the oil at each of the loads and the torque in pounds per square inch at each load, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for 5 minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The lubricating oil used in this example is a purified mineral oil marketed commercially by A. H. Carnes Company as "Carnes 340 White Oil." Typical specifications of this oil include the following:

| | |
|---|---:|
| Distillation range, ° F | 740–975 |
| Specific gravity at 60° F. | 0.8836 |
| Viscosity: | |
| At 100° F. | 360 |
| At 210° F. | 52.2 |
| Flash point, COC, ° F. | 440 |
| Pour point, ° F. | −20 |
| Refractive index at 68° F. | 1.4805 |
| Saybolt color | +30 |

Run No. 1 in the following table is a run made using the white oil not containing an additive and thus is the blank or control run.

Run No. 2 is a run made using another sample of the white oil to which had been added 2% by weight of the reaction product of dodecyl catechol and $P_2S_5$ prepared as described in Example I.

Run No. 3 is a run made using another sample of the white oil to which had been added 2% by weight of the amine salt prepared as described in Example VI.

Run No. 4 is a run made using another sample of the white oil to which had been added 2% by weight of the amine salt prepared as described in Example IV.

Run No. 5 is a run made using another sample of the white oil to which had been added 2% by weight of the amine salt prepared as described in Example V.

TABLE I

| Run No. | Temperature, ° F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, ° F. |
| 1 | 172 | 350-S | | 5–6 | 30-S | | 0 | S | | 425 | <0.1 | 275 |
| 2 | 195 | 297 | 390 | 5–6 | 12–15 | 20–25 | 0 | 0 | 2 | 1,000 | 4 | 475 |
| 3 | 170 | 295 | 392 | 4–5 | 11–13 | 20–23 | 0 | 0 | 2 | 1,250 | <0.1 | 475 |
| 4 | 170 | 256 | 375 | 4–6 | 9–12 | 13–18 | 0 | 0 | 15 | 1,250 | 2.5 | 425 |
| 5 | 162 | 265 | 357 | 4–5 | 9–12 | 12–20 | 0 | 0 | 13 | 1,250 | 0.5 | 438 |

S=Seizure.

From the data in Table I, it will be seen that the white oil without additive (Run No. 1) underwent seizure by the time the load had increased to 425 pounds. In contrast, the white oil containing the additives of the present invention did not undergo seizure at a load of 750 pounds. Referring specifically to the seizure conditions reported in the last three columns of Table I, it will be noted that the actual load conditions for seizure to occur in Run No. 1 was 425 pounds and that the temperature of the oil was only about 275° F. In contrast, seizure did not occur with the oils containing the additives of the present invention until 1000 or 1250 pounds and the temperature of the oil was considerably higher which, as hereinbefore set forth, is desired to demonstrate that the oil operates satisfactorily at the higher temperature.

Example VIII

Another series of evaluations were made using dioctyl sebacate as the synthetic lubricating oil. The dioctyl sebacate is marketed commercially under the trade name of "Plexol 201." These runs were made in the same manner as described in Example VII.

Run No. 6 is a run made using the dioctyl sebacate without additive and thus is the blank or control run.

Run No. 7 is the run made with another sample of the dioctyl sebacate to which have been added 2% by weight of the amine salt prepared as described in Example VI.

Run No. 8 is the run made with another sample of the dioctyl sebacate to which have been added 2% by weight of the amine salt prepared as described in Example V.

samples were pressed into sheets of 17 mil thickness and cut into plaques of 1⅜" x 1½". The plaques then were inserted into plastic holders, affixed onto a rotating drum and exposed to carbon arc rays at about 125° F. in the Weather-Ometer. Periodically samples of the polypropylene were subjected to infrared analysis and the intensity of the carbonyl band at 1715 cm.$^{-1}$ was determined and expressed as "carbonyl number." The formation of carbonyl groups is an indication of deterioration of the polyolefin. The higher intensity of the carbonyl band indicates a higher carbonyl concentration (expressed as carbonyl number) and accordingly increased deterioration.

The following table reports results of evaluations in the Weather-Ometer. Run No. 9 is an evaluation made of the polypropylene without inhibitor and thus is the blank or control run.

Run No. 10 is an evaluation of another sample of the polypropylene to which 1% by weight of the amine salt of Example VI had been incorporated.

Run No. 11 is an evaluation of another sample of the polypropylene in which 1% by weight of the amine salt of Example IV had been incorporated.

TABLE II

| Run No. | Temperature, ° F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, ° F. |
| 6 | 150 | 231 | 490–S | 3–4 | 9–10 | 18–S | 0 | 0 | S | 750 | 2 | 490 |
| 7 | 160 | 265 | 382 | 3–6 | 11–14 | 15–25 | 0 | 0 | 19 | 1,250 | 4.7 | 513 |
| 8 | 175 | 267 | 240 | 4–6 | 10–14 | 12–19 | 0 | 0 | 18 | 1,500 | 2 | 450 |

S = Seizure.

From the data in Table II, it will be seen that the dioctyl sebacate without additive (Run No. 6) underwent seizure at a load of 750 pounds. In contrast, seizure conditions for the samples of dioctyl sebacate containing the additives of the present invention were 1250 and 1500 pounds.

Example IX

As hereinbefore set forth, the additives of the present invention also are effective inhibitors of photolysis. Accordingly, they are desirable for use in plastics and especially plastics exposed outdoors.

This example reports results of evaluations made in a special batch of commercial solid polypropylene. This special batch of solid polypropylene was obtained free of inhibitors in order that it may be used as a proper control sample to evaluate the effect of different inhibitors.

The solid polypropylene used in this example is stated to have the following properties:

Specific gravity _____ 0.910–0.920
Refractive index, $n_D^{25}$ _____ 1.510
Heat distortion temperature:
    At 66 p.s.i. load, ° F. _____ 240
    At 264 p.s.i. load, ° F. _____ 150
Tensile yield strength, p.s.i. (ASTM D–638–58T) (0.2" per min.) _____ 4700
Total elongation, percent _____ 300–400
Stiffness flexural (ASTM D747–50) $10^5$ p.s.i. _____ 1.8
Shore hardness (ASTM D676–55T) _____ 74D In one method the solid polypropylene was evaluated in an Atlas type DLXTS Weather-Ometer. The Weather-Ometer may be operated with or without the use of water sprays to simulate accelerated moist weathering. In the present runs, the water sprays were not used. Polypropylene pellets were milled in a two-roll heated mill of conventional commercial design and the inhibitor was incorporated in the samples during the milling. The additive was incorporated in the sample during the milling. The Run No. 12 is an evaluation of another sample of the polypropylene in which 1% by weight of the amine salt of Example V had been incorporated.

For comparative purposes, run No. 13 is a run made using another sample of the polypropylene in which 1% by weight of dodecyl catechol had been incorporated.

In addition to effectively retarding photolytic decomposition of the polyolefin, the additives of the present invention possess the important advantage of not causing discoloration of the polypropylene. In other words, during the milling of the polypropylene and during the exposure in the Weather-Ometer, the color of the polypropylene did not change.

TABLE IV

| Run No. | Carbonyl Content After Following Hours | | | | | | |
|---|---|---|---|---|---|---|---|
| | 0 | 48 | 72 | 144 | 264 | 456 | 648 |
| 9 | 125 | 753 | | >1,000 | | | |
| 10 | 192 | | 356 | | 506 | 520 | 697 |
| 11 | 127 | | 268 | | 403 | 439 | |
| 12 | 138 | | 274 | | 391 | 402 | 780 |
| 13 | 173 | | 210 | | 320 | 900 | |

Referring to the data in Table IV, it will be seen that the polypropylene without inhibitor (Run No. 9) reached a carbonyl number of >1000 within 144 hours, whereas the samples of the polypropylene containing the additives of the present invention (Runs Nos. 10, 11 and 12) developed a carbonyl number of only about 500 after 456 hours and, in the case of Runs Nos. 10 and 12 still did not reach a carbonyl number of 1000 after 648 hours of exposure in the Weather-Ometer. Referring to run No. 13, it will be noted that the sample of polypropylene containing dodecyl catechol developed a carbonyl number of 900 after 456 hours of exposure.

Example X

Samples of the polypropylene described in Example IX also were evaluated by outdoor exposure. Other plaques of polypropylene, prepared in the same manner as described above, were exposed to weathering on an outdoor rack facing south and inclined at a 45 degree angle at Des Plaines, Ill. The samples were analyzed periodically for carbonyl formation and the results of these evaluations are reported below.

A sample of the polypropylene without inhibitor was placed outdoors in the middle of May and, by the end of the month, the carbonyl number had increased from 122 to 716, thus showing rapid and severe deterioration.

Another sample of the polypropylene containing 1% by weight of the amine salt of Example VI was exposed outdoors in the early part of April and after 86 days had developed a carbonyl number of 620. This is in contrast to the carbonyl number of 716 within 13 days for the sample without the additive.

Another sample of the polypropylene containing 1% by weight of the amine salt of Example IV likewise was exposed outdoors in the early part of April and had developed a carbonyl number of 606 after 86 days of outdoor exposure.

Another sample of the polypropylene containing 1% by weight of the amine salt of Example V similarly was placed outdoors in the early part of April and had developed a carbonyl number of 602 after 86 days of outdoor exposure.

For comparative purposes, another sample of the polypropylene to which 1% by weight of dodecyl catechol had been incorporated, also was placed outdoors in the early part of April. However, after 86 days of outdoor exposure, the carbonyl number of this sample had increased to >1000.

*Example XI*

As hereinbefore set forth, the additives of the present invention also are effective antioxidants. The antioxidant properties of the additives were evaluated in a method similar to that described by Hawkins, Hansen, Matreyek and Winslow in Rubber Chemistry and Technology, October-November 1959, pages 1164–1170, except that an electrically heated aluminum block rather than an oven was used to maintain the desired temperature. The oxygen absorption of the sample was determined manometrically rather than volumetrically. In this method samples of the polypropylene, weighing about 0.5 gram each, are placed in separate 8 mm. glass tubes and the tubes then are inserted into horizontal rows of openings located concentrically around the heater. The temperature is maintained at about 284° F. The glass tubing also is packed with glass wool and molecular sieves to absorb the gases. Each of the glass tubes is connected to individual manometers containing mercury and the differential pressure is periodically determined. The Induction Period is taken as the number of hours required to reach a pressure differential of 20 cm. Hg.

A sample of the polypropylene, when evaluated in the above manner, reached the Induction Period of a differential pressure of 20 cm. Hg in one and one-half hours.

Another sample of the polypropylene containing 1% by weight of the amine salt of Example VI did not reach the Induction Period until 1500 hours.

Another sample of the polypropylene containing 1% by weight of the amine salt of Example IV did not reach the Induction Period until more than 1676 hours.

Another sample of the polypropylene containing 1% by weight of the amine salt of Example V did not reach the Induction Period until more than 1700 hours.

For comparative purposes, a sample of the polypropylene containing 1% by weight of dodecyl catechol also was evaluated in the same manner. This sample reached the Induction Period after only 120 hours.

From the above data, it will be seen that the additives of the present invention were very effective in retarding oxidation of the polypropylene.

*Example XII*

Because the solid polypropylene used as the substrate in Examples IX through XI is more difficult to stabilize, improved results are obtained when the additive of the present invention is used in conjunction with one or more additional additives. Accordingly, a particularly preferred additive composition comprises 1% by weight of the additive of Example V and 0.15% by weight of butylated hydroxy toluene (2,6 - ditertiarybutyl - 4-methylphenol), which combination appears to produce a synergistic effect.

Both additives are incorporated in the polypropylene during milling and, after preparing plaques in the manner hereinbefore set forth, the plaques are evaluated both in the Weather-Ometer and by outdoor exposure.

*Example XIII*

The inhibitor of Example V is incorporated in a concentration of 1% by weight in a solid polyethylene of the high density type. The solid polyethylene is obtained free of inhibitors and otherwise is the same as the product marketed commercially under the trade name of "Fortiflex" by the Celanese Corporation of America. The polyethylene is milled in a two-roll heated mill of conventional commercial design and the inhibitor is incorporated in the polyethylene during the milling. The samples then are pressed into sheets and formed into plaques in the same manner as hereinbefore set forth. The plaques are evaluated both in the Weather-Ometer and by outdoor exposure in the same manner as described in the previous examples.

*Example XIV*

The reaction product of hexadecyl catechol with $P_2S_5$ is prepared in substantially the same manner as hereinbefore set forth and the reaction product then is used in a concentration of 0.3% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 450° F., with constant agitation. Subsequently, the grease is cooled, while agitating, to approximately 250° F., and then the grease is further cooled slowly to room temperature.

The stability of the grease is tested in accordance with ASTM D-942 method, in which method a sample of the grease is placed in a bomb and maintained at a temperature at 250° F. Oxygen is charged to the bomb, and the time required for a drop of 5 pounds pressure is taken as the Induction Period. A sample of the grease without additive will reach the Induction Period in about 8 hours. On the other hand, a sample of the grease containing 0.3% by weight of the additive of the present invention will not reach the Induction Period for more than 100 hours.

We claim as our invention:

1. A salt of the product formed by heating to refluxing temperature two mole proportions of a catechol and one mole proportion of phosphorus pentasulfide and an amine consisting of carbon, hydrogen and nitrogen and containing at least one primary or secondary amine group and from 1 to about 40 carbon atoms per molecule.

2. The salt of claim 1 wherein said catechol is an alkyl catechol in which said alkyl contains from one to about twenty carbon atoms.

3. The salt of claim 1 wherein said catechol is dodecyl catechol.

4. The salt of claim 1 in which said amine is an alipathic amine.

5. The salt of claim 1 in which said amine is an alipathic amine containing from six to forty carbon atoms.

6. The salt of claim 1 wherein said amine is an alkylene polyamine containing from six to forty carbon atoms.

7. The salt of claim 1 wherein said amine is a cyclic amine.

8. A salt of oleyl amine and the product formed by the reaction of two mole proportions of a catechol and one mole proportion of phosphorus pentasulfide at a temperature of from about 212° to about 392° F.

9. A salt of N-tallow-1,3-diaminopropane and the product formed by the reaction of two mole proportions of a catechol and one mole proportion of phosphorus pentasulfide at a temperature of from about 212° to about 392° F.

10. The salt of claim 2 in which amine is the cyclic amine reaction product of N',N$^3$-disec-octyl-diethylenetriamine and carbon disulfide.

References Cited
UNITED STATES PATENTS 2,506,570   5/1950   Andress _____ 260—981 X CHARLES B. PARKER, *Primary Examiner.*

FRANK M. SIKORA, A. H. SUTTO, *Assistant Examiner.*